United States Patent [19]

Rutkowski et al.

[11] Patent Number: 4,547,821

[45] Date of Patent: Oct. 15, 1985

[54] HEAD SUPPORT AND POSITIONING ASSEMBLY FOR RECORD/PLAYBACK DEVICE

[75] Inventors: Richard G. Rutkowski, Milford; John J. Dwyer, Stratford; John W. Hoover, Huntington, all of Conn.

[73] Assignee: Dictaphone Corporation, Rye, N.Y.

[21] Appl. No.: 434,249

[22] Filed: Oct. 14, 1982

[51] Int. Cl.[4] .......................... G11B 5/54; G11B 21/12
[52] U.S. Cl. ...................................................... 360/75
[58] Field of Search ........................... 360/75, 78, 105; 369/57, 98

[56] References Cited

U.S. PATENT DOCUMENTS

| | | | |
|---|---|---|---|
| 2,248,790 | 7/1941 | Stapelfeldt | 360/89 |
| 3,578,334 | 5/1971 | Ban | 360/78 |
| 3,632,114 | 1/1972 | Ban | 360/78 |
| 3,823,945 | 7/1974 | Milligan | 360/96 |
| 3,833,922 | 9/1974 | DeBell et al. | 360/105 |
| 3,873,993 | 3/1975 | Starr | 360/90 |
| 3,949,421 | 4/1976 | Herleth et al. | 360/96 |
| 3,959,822 | 5/1976 | Platt | 360/96 |
| 4,149,203 | 4/1979 | Kobayashi et al. | 360/60 |
| 4,176,383 | 11/1979 | Suzuki | 360/105 |
| 4,177,490 | 12/1979 | Broghammer | 360/105 |
| 4,214,283 | 7/1980 | Fushimi et al. | 360/71 |
| 4,263,626 | 4/1981 | Kobayashi | 360/60 |
| 4,272,792 | 6/1981 | Nakamichi et al. | 360/69 |
| 4,309,733 | 1/1982 | Tomabechi | 360/105 |
| 4,373,172 | 2/1983 | Motoyama et al. | 360/105 |

FOREIGN PATENT DOCUMENTS 2062934 5/1981 United Kingdom .
2070317 9/1981 United Kingdom .

*Primary Examiner*—George G. Stellar
*Attorney, Agent, or Firm*—Curtis, Morris & Safford

[57] ABSTRACT

Apparatus is provided for supporting and positioning a record/playback transducer with respect to a record medium in a record and/or playback device. The transducer is supported on a mounting plate which is guided for bi-directional sliding movement to position the transducer in engagement, disengagement and partial engagement with the record medium in response to motive power provided by a selectively energizable motor. Energizing power is supplied to the motor in response to the actuation of a respective function control switch, and the motor remains energized until the mounting plate moves the transducer into the appropriate position by which the selected function may be carried out. In one embodiment, the motor rotates a cam whose cam surface is in contact with a portion of the mounting plate. The position of the plate and, thus, the transducer, is sensed as a function of the angular position of the cam.

22 Claims, 6 Drawing Figures

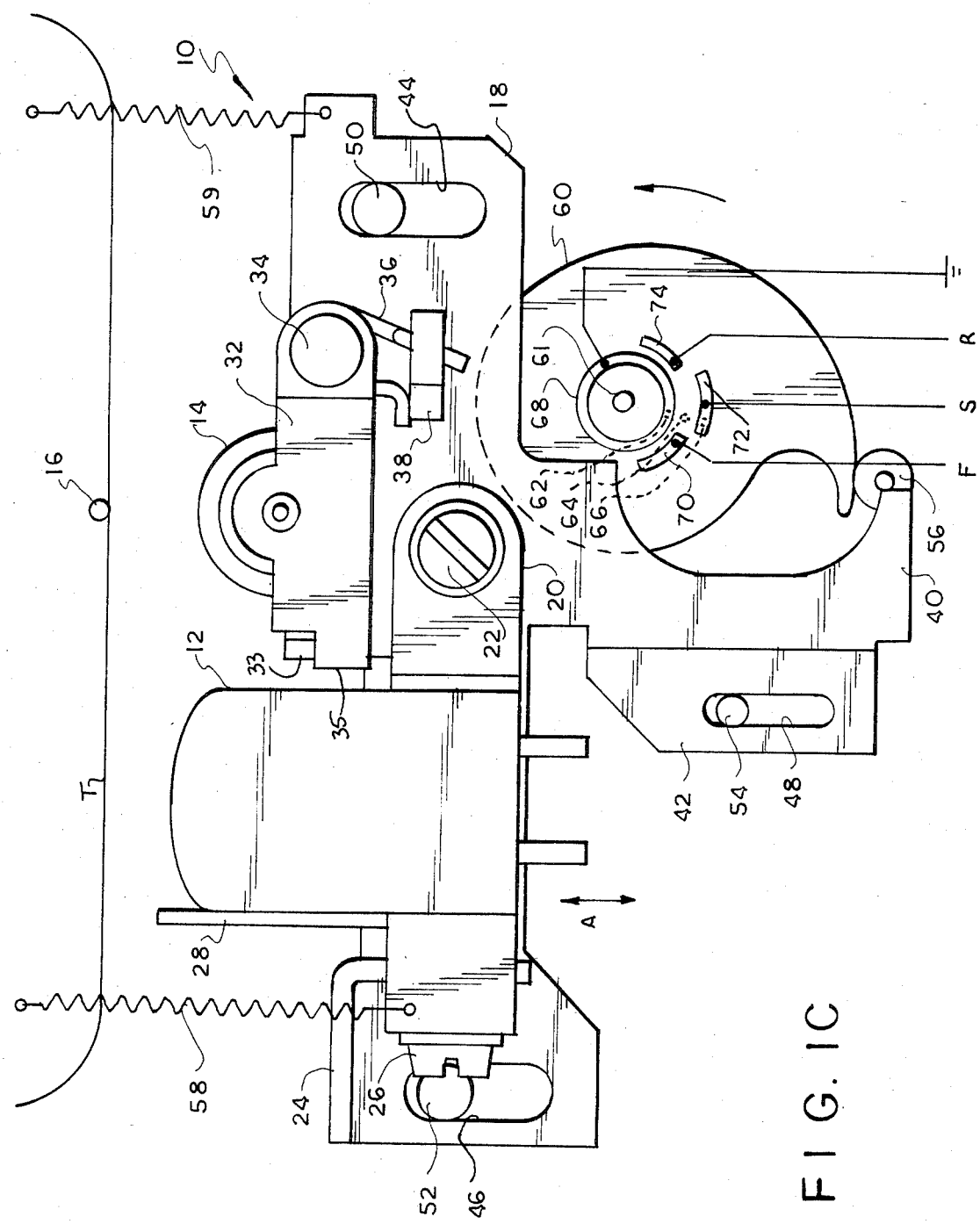
FIG. IC

FIG. 2
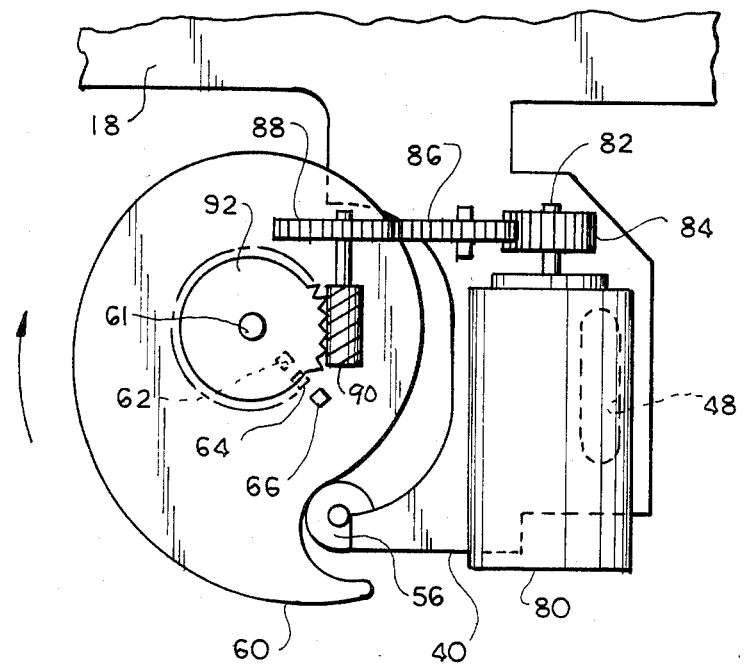
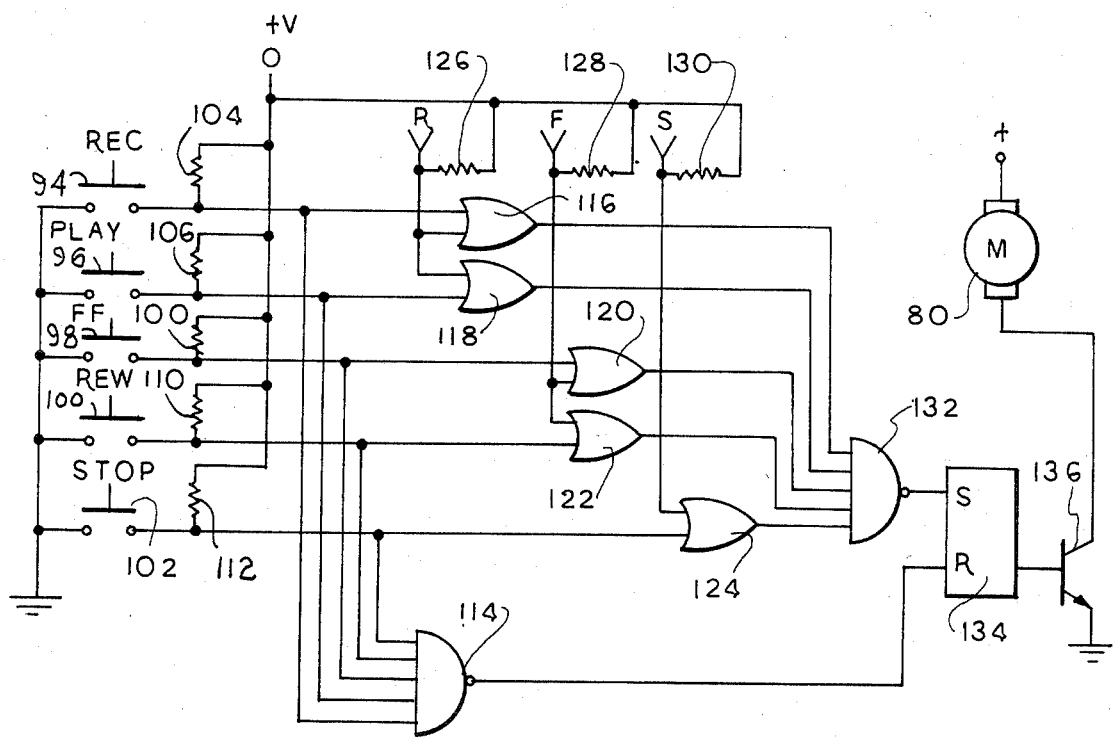
FIG. 3

HEAD SUPPORT AND POSITIONING ASSEMBLY FOR RECORD/PLAYBACK DEVICE

BACKGROUND OF THE INVENTION

This invention relates to apparatus for supporting a record/playback transducer for use in a record and/or playback device and, more particularly, to such apparatus wherein the transducer and its support structure are motor driven for bi-directional sliding movement to at least first, second and intermediate positions.

Transducers, commonly referred to as heads, are widely used for recording and/or reproducing information on a record medium. For example, magnetic transducers or heads are used to record and play back information on a magnetic medium, such as a magnetic tape. To effect accurate signal recording and reproduction, the head should be disposed in good magnetic contact with the tape. Frequently, however, it is advantageous to transport the tape rapidly in a forward or rewind direction in order to access quickly a selected portion at which signals then may be recorded or played back. For such rapid tape movement, it is desirable to displace the head from the tape such that, when the tape is transported quickly, there is little contact and, thus, little abrasion of the moving tape with the head. This avoids damage both to the head and to the tape.

Various types of signal recording and/or playback devices have been introduced for use with magnetic tape housed in a cassette. Such cassette recorders are used to record and/or reproduce information in the form of analog signals or digital signals on the magnetic tape. One type of analog signal recorder records or reproduces sound (or audio) signals to function as, for example, a dictating/transcribing machine. In devices of this type, the head or heads should be movable so as to be inserted into and withdrawn from the cassette, thereby permitting audio signals to be recorded or reproduced, and also permitting the tape to be transported rapidly from one reel to the other within the cassette, and also permitting the cassette to be loaded into and withdrawn from the device.

One type of head support structure which has been proposed for such a cassette-type recorder is described in U.S. Pat. No. 4,056,835. As disclosed therein, a record/playback head is mounted on a pivotable support member which rotates through an arc so as to selectively insert or withdraw the head from the cassette. The support member and, thus, the head is driven by a selectively energizable solenoid. Another pivotable head support assembly is described in U.S. Pat. No. 3,833,922. A disadvantage of such pivotable head support assemblies is that they require a substantial amount of space in order to operate properly. Hence, recording devices which incorporate such pivotable head support assemblies often are relatively bulky and not easily miniaturizable. Such head support assembles thus are not readily incorporated into recorders which are adapted for use with cassettes of very small size.

Another type of head support assembly which has been designed for cassette-type recorders contemplates the mounting of the head on a slidable support member, for example, as shown in U.S. Pat. Nos. 3,873,993 and 4,176,383, as two typical examples. Usually, however, such slidable head support structures are mechanically coupled to push-buttons which extend outwardly from the recorder and which are operated directly by the user so as to urge the support structure and, thus, the head into and out of engagement with the cassette tape. Although such mechanically-linked slidable head support structures have been designed successfully for small-sized recorders, there is a practical limitation on miniaturization thereof. For example, the push-buttons, or levers, must be of sufficient size to be operated by the user. If the push-buttons are too small and too closely spaced, the user inadvertently might operate an erroneous push-button, thus initiating an undesired mode of operation of the recorder. Furthermore, to allow interaction, such as interlocking and release, among the various push-buttons and levers, there must be sufficient space within the recorder to accommodate the appropriate elements. Therefore, even if relatively small slidable movements are all that may be needed for proper operation of the recorder, the foregoing limitations on size reduction tend to prevent adequate exploitation of miniaturization of the recorder.

Recently, it has been proposed that the slidable head support structure may be driven for bi-directional movement by a selectively energizable drive motor rather than through direct mechanical linkages to push-buttons. Miniaturized motors which exhibit low power supply requirements can be bi-directionally energized, for example, to drive the support structure in one direction so as to engage the head with magnetic tape, and to return the support structure to its "home" position so as to disengage the head from the tape. Typically, the head is in engagement with the tape only for record and playback operations. The head is disengaged from the tape during rapid tape transport (e. g. fast forward and rewind movement of the tape), as well as during standby or quiescent (e. g. stop) modes. Unfortunately, when this type of motor-driven head support structure is used in a sound recorder such as a dictating machine, the fact that the head disengages the tape during fast forward and rewind tape movements results in difficulty for the user to transport the tape rapidly to a desired location. This is because the head, when disengaged from the tape, is spaced a relatively large distance therefrom and cannot detect signals which had been recorded on the tape. As a result, the user must initiate numerous fast-forward and rewind operations in order to advance the tape to its desired location.

Another disadvantage attending the aforementioned motor-driven head support structure is the inability therein to sense the relative location of the head with respect to the tape. Usually, the motor is energized in one direction for a period of time that is long enough to ensure that the head has been driven into proper engagement with the tape. Likewise, to withdraw the head, the motor is driven in the opposite direction for approximately the same length of time. No provision is made to move the support structure and, thus, the head to an intermediate position. Nor do such motor-driven head support structures contemplate the use of position sensing means for sensing when the head is in its engaged or disengaged positions; or of sensing when the head lies somewhere therebetween.

OBJECTS OF THE INVENTION

Therefore, it is an object of the present invention to provide improved apparatus for supporting a record/playback transducer, or head, for use in a record and/or playback device which avoids the aforementioned disadvantages and drawbacks of known support structures.

Another object of this invention is to provide apparatus of the aforementioned type which is readily adapted to be miniaturized for use with magnetic tape cassettes, for example, of ultra-small size.

A further object of this invention is to provide apparatus of the aforementioned type wherein the head support means is driven by a motor between first, second and intermediate positions.

An additional object of this invention is to provide apparatus of the aforementioned type wherein the position of the head is sensed so as to effect control over the motor and, thus, dispose the head in any desired position, including those positions whereby the head is in engagement, disengagement and partial engagement with the tape.

A still further object of this invention is to provide apparatus of the aforementioned type wherein the pinch roller may be disposed at a partial engagement position such that it is spaced from the tape so as to minimize interference with rapid tape transport, while the head is sufficiently close to the tape to detect signals thereon and thereby facilitate the rapid movement of the tape to a desired location.

Yet another object of this invention is to provide apparatus of the aforementioned type wherein a motor-driven cam means is used to move the head support structure so as to position the head in engagement, disengagement and partial engagement with the tape.

Another object of this invention is to provide apparatus of the aforementioned type wherein the position of the head is sensed by sensing the angular position of the motor-driven cam means.

An additional object of this invention is to provide improved apparatus of the aforementioned type wherein control circuitry is provided in order to selectively energize the motor, whereby the head is rapidly moved to its engaged, disengaged or partially engaged position as commanded by the user's operation of a function control switch.

A further object of this invention is to provide improved apparatus of the aforementioned type wherein the motor control circuitry operates to position the head so as to carry out record/playback, fast-forward/rewind and stop operations, when the invention is used in, for example, a dictating machine.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for supporting a record/playback transducer, or head, for use in a record and/or playback device. The transducer is mounted on a slidable support which is guided for bi-directional sliding movement. A selectively energizable motor is coupled by way of a transmission to the head support. Respective positions of the support, including first, second and intermediate positions, are sensed by a position sensor, and motor control circuitry energizes the motor to change the position of the head support, the motor control circuitry being responsive to the position sensor when the latter senses a predetermined one of the first, second and intermediate positions so as to deenergize the motor.

The head support apparatus is of very small size and may be used with, for example, an ultra-small tape cassette of the type described in copending applications Ser. Nos. 388,539 and 388,540.

In accordance with one aspect of this invention, the motor is coupled to the head support by rotatable cam means, a portion of the head support being in contact with the surface of the cam means such that as the cam means rotates, the cam surface imparts driving movement to the head support.

In accordance with another aspect of this invention, the position sensor is adapted to sense the angular position of the cam means, thereby indicating whether the head support and, thus, the head exhibits an engaged, disengaged or partially engaged position. In this regard, the position sensor includes a set of cam contacts and a set of conductive segments which are rotatable with respect to each other, the cam contacts being coupled to and rotatable with the cam means and the conductive segments being fixed with respect thereto. An electrical voltage is supplied to, for example, a central conductive segment and, depending upon the angular position of the cam means, this voltage is applied by the cam contacts to a respective one of the remaining segments. By detecting which of these remaining segments is supplied with the voltage, the angular position of the cam means and, thus, the position of the head, is sensed.

In accordance with a feature of this invention, the motor control circuitry includes various function switches, each being selectively operable to energize the motor so as to move the head support to a corresponding position. Energizing power is enabled to be supplied to the motor when a function control switch is operated and the position sensor senses that the head is not yet at the corresponding position. However, once the head reaches the position whereat the function commanded by the operated function control switch may be carried out, the motor is disabled thereby stopping the movement of the head support and, thus, the head.

BRIEF DESCRIPTION OF THE DRAWINGS

The following detailed description, given by way of example, will best be understood in conjunction with the accompanying drawings in which:

FIGS. 1A-1C are top plan views of the movable head support assembly in accordance with the present invention;

FIG. 2 is a bottom plan view of the motor drive arrangement used with the present invention;

FIG. 3 is a schematic logic diagram of one embodiment of motor control circuitry which may be used with the present invention.

DETAILED DESCRIPTION OF A PREFERRED EMBODIMENT

Figure 1A:
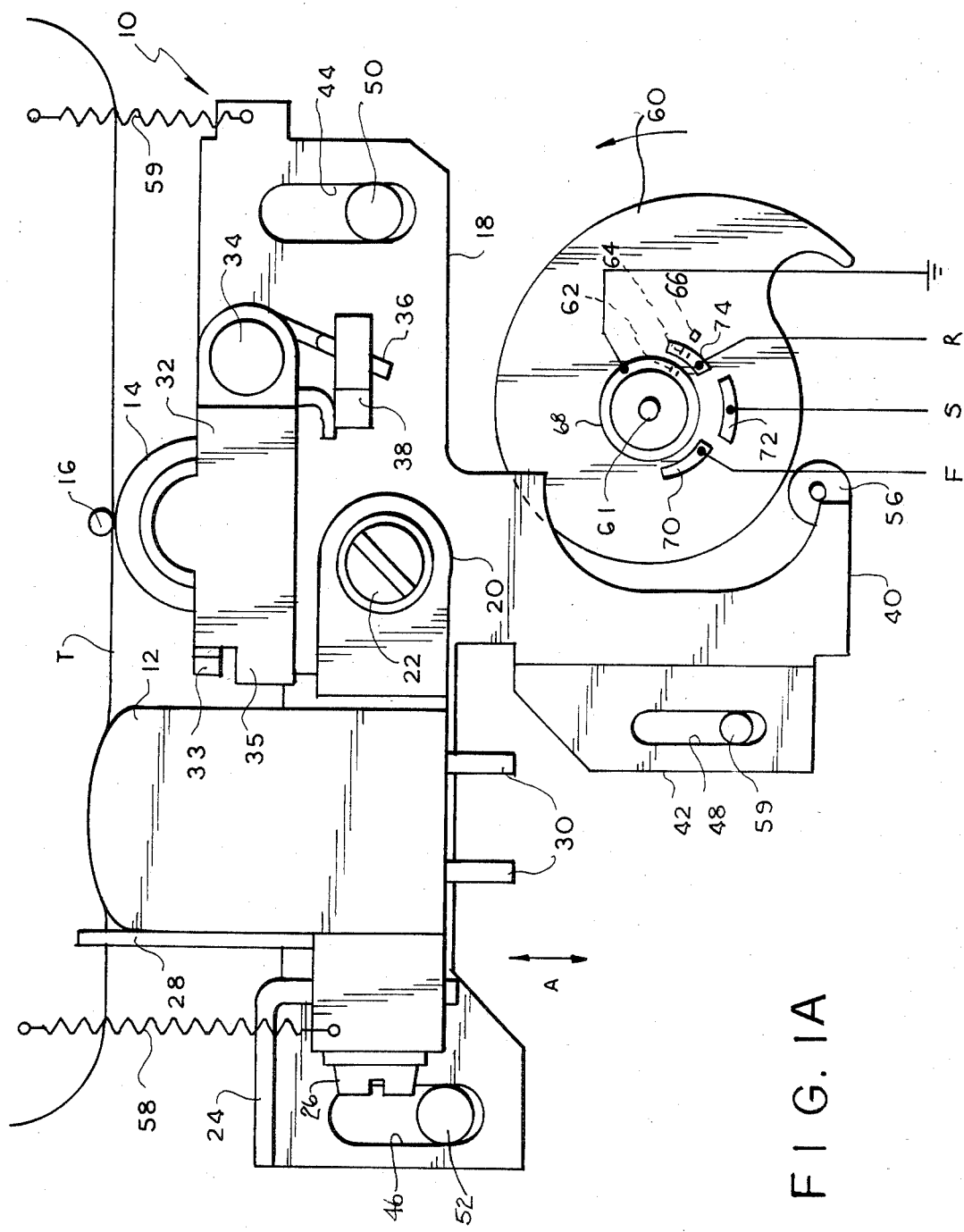

In order to facilitate a ready understanding thereof, the present invention will be described in the environment of a capstan-driven audio signal record and/or playback device. It will be readily appreciated, however, that the signals which may be recorded can be data signals, digital signals, or the like. Also, the present invention need not be limited solely to capstan-driven record and/or playback devices. Rather, so-called hub-driven or reel-driven devices may utilize the head support structure of the present invention. Still further, the slidably movable head support structure disclosed herein is adapted for use in an ultra-small sized tape recorder which utilizes ultra-small tape cassettes of the type described in copending applications Ser. Nos. 388,539 and 388,540. However, and as will be pointed out in the claims, the invention need not be limited solely to such small-sized recorders and cassettes.

As used herein, the word "recorder" is intended to refer to a device which records signals (analog or digital) on a record medium (e. g. magnetic tape of, for example, a tape cassette), reproduces signals from that medium or both records and reproduces signals thereon. Also, as used herein, the word "transducer" or "head" is intended to mean a conventional device, such as a magnetic head, which converts electrical signals into other signals, such as magnetic signals, or produces electrical signals in response to such other signals. Typically, a magnetic transducer or head is described herein which is adapted to record or reproduce signals on magnetic tape.

The recorder with which the present invention is used includes a number of function control switches, each of which being manually operable to initiate a corresponding function. For example, the recorder includes a RECORD switch which, when operated, initiates a record operation by which signals are recorded on the magnetic tape. The recorder also includes a PLAY switch which, when operated, initiates a playback operation by which previously recorded signals are played back from the magnetic tape. Additional switches include a FAST FORWARD switch which, when operated, initiates a fast-forward operation by which the tape is transported rapidly in the forward direction; and a REWIND switch which, when operated, initiates a rewind operation by which the tape is transported rapidly in the reverse direction. Various other function control switches also are included; but for the purpose of understanding the present invention, the only additional switch which need be mentioned is a STOP switch which, when operated, disposes the recorder in a stop, or quiescent mode, whereby the tape cassette may be loaded into or removed from the recorder, and from which quiescent mode any of the other operating modes may be assumed.

In both the record and playback modes, the head is inserted into the cassette in which the tape is housed, and is placed in engagement with the tape so as to be in good magnetic contact therewith to enable signals to be recorded on and reproduced from the tape. The tape is pulled, or dragged, across the surface of the head when the latter engages the tape. In the stop or quiescent mode of operation, the head disengages the tape and is fully withdrawn or removed from the cassette. The cassette thus is free from obstruction and can be removed from the recorder, or a fresh cassette may be loaded therein, as desired by the user. In both the fast-forward and rewind modes, the head is in an intermediate position, referred to herein as being in "partial engagement" with the tape. The intermediate position is intermediate the engaged and disengaged positions. In the intermediate, or partially engaged, position, the head is closely spaced to and even slightly contacting the tape and the pinch roller is free of the capstan so as to permit the tape to be transported rapidly. However, the head detects the magnetic flux produced by the signals which are recorded on the tape, this detected flux being converted to electrical signals which are reproduced as sound. Since the tape is transported at a rapid speed, the reproduced sounds are perceived as unintelligible signals of relatively higher pitch, generally referred to as "monkey chatter". These detected signals are useful to the user in locating an area on the tape for playing back further signals or, alternatively, for recording new signals. For example, if a relatively large section of the tape is rewound, the tape then may be driven in its fast-forward mode until the farthest advance position thereof is reached, whereupon new signals then may be recorded. This farthest advance position is determined by perceiving the end of the monkey chatter which is reproduced during the fast-forward tape movement.

Figure 1B:
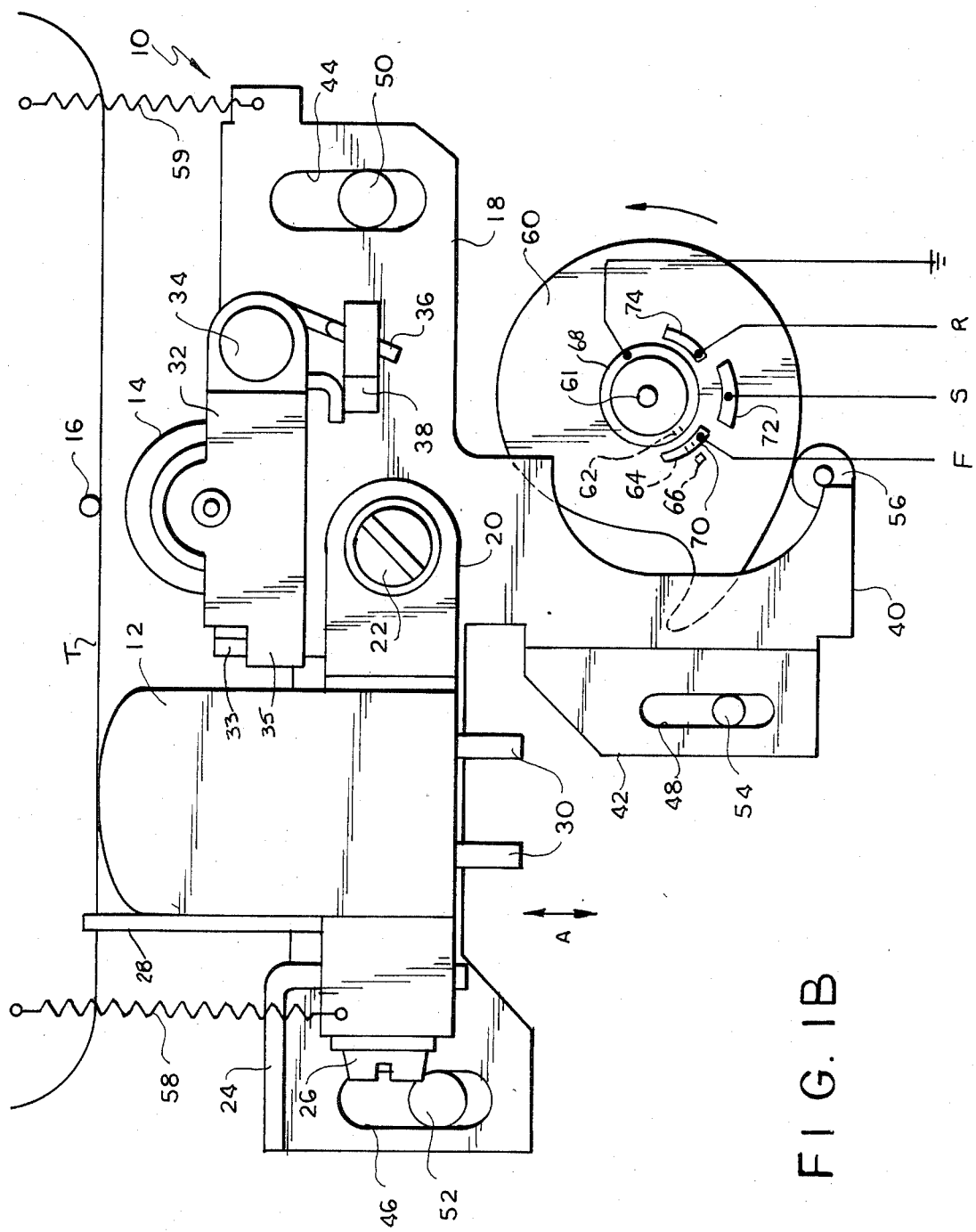

Referring now to the drawings, wherein like reference numerals are used throughout, FIGS. 1A-1C illustrate a transducer support assembly 10 which may be selectively disposed at three particular locations, viz. engaged (FIG. 1A), partially engaged (FIG. 1B) and disengaged (FIG. 1C), respectively; and FIG. 2 illustrates the motor drive used in conjunction with transducer support assembly 10. The transducer support assembly is comprised of a mounting plate 18 on which a record/playback transducer, or head 12 and a pinch roller 14 are mounted, and a cam 60 which is rotatably driven by a motor 80 to move mounting plate 18. As mentioned above, the present invention is described in the environment of a capstan-driven recorder; and pinch roller 14 is provided for the usual purpose of engaging a capstan, such as capstan 16, to advance tape T. The capstan is driven by suitable means (not shown) for advancing the tape when the capstan and pinch roller are in engagement, as illustrated in FIG. 1A.

Head 12 is mechanically secured to a transducer support bracket 20; and this bracket 20 is mounted upon mounting plate 18 by means of a screw 22. An adjusting spring (not shown) may be wound about screw 22 so as to adjust the relative height of head 12 with respect to mounting plate 18. The left end of mounting plate 18, as viewed in FIGS. 1A-1C, is provided with an upstanding flange 24 to which transducer support bracket 20 is secured by means of an additional screw 26. Of course, if desired, other suitable mounting means may be provided to mount head 12 on mounting plate 18.

As is conventional, head 12 is provided with a bifurcated, or U-shaped tape guide 28 which is adapted to receive tape T and guide the tape across the usual air gap of the head. The tape guide serves to properly position the tape with respect to this air gap so that the correct channels, or tracks may be recorded on and reproduced from the tape. Also, head 12 includes electrical connectors 30 which are coupled by means of conducting leads (not shown) to suitable audio signal processing circuitry. For example, connectors 30 may be coupled to record and playback amplifiers, as is conventional. In the interest of brevity, further description of the audio signal processing circuitry, including the usual microphone and loudspeaker utilized therewith, are not described.

Pinch roller 14 is rotatably mounted in a pinch roller support bracket 32 which, in turn, is secured to mounting plate 18 by a stud 34. Stud 34 also serves as a pivot axis about which pinch roller support bracket 32 rotates, and the pinch roller support bracket is resiliently urged in the forward direction, that is, in the direction toward capstan 16, by means of a bias spring 36. A retainer 38 provided on mounting plate 18 serves to retain the bias spring such that a suitable bias force is exerted on pinch roller support bracket 32 to urge this bracket in the clockwise direction about the pivot axis defined by stud 34. An upstanding pin 33 extending from mounting plate 18 cooperates with a projection 35 from bracket 32 to function as a mechanical stop for limiting the forward movement (i. e. movement toward capstan 16) of the pinch roller support bracket. It will be appreciated that, when the illustrated head support structure is in its engaged position (FIG. 1A), the bias force urged on bracket 32 and pinch roller 14 is overcome by the contact between the pinch roller and capstan 16, thus moving the pinch roller support bracket in the rearward direction to separate pin 33 and projection 35. Nevertheless, this bias force assures good contact between the pinch roller and capstan, as is conventional (such as shown in, for example, U.S. Pat. No. 3,833,922).

Mounting plate 18 also includes a depending actuating arm 40 which, as will be described, cooperates with cam 60 to be driven by the latter in the bi-direction illustrated by arrow A. In particular, mounting plate 18 is adapted to be driven for slidable movement and, in this regard, suitable guide slots 44 and 46 are provided at the right and left end portions, respectively, of the mounting plate; and a guide member 42 is coupled to actuator arm 40, this guide member also including a guide slot 48. Suitable guide pins 50, 52 and 54 are provided on a base plate, or chassis, (not shown) of the recorder, these guide pins cooperating with guide slots 44, 46 and 48, respectively, to permit slidable movement in the direction indicated by the arrow A but preventing any lateral or rotatable movement of mounting plate 18. Guide pins 50 and 52 also function as mechanical stops for mounting plate 18, as illustrated in FIG. 1A. Thus, the mounting plate is restrained from undesired lateral or rotary movement, and is free to be driven only toward or away from tape T.

Actuator arm 40 has a cam follower 56 secured thereto, this cam follower being positioned in a plane which is, for example, beneath the plane of the actuator arm, as viewed in FIGS. 1A–1C. As will be described, cam follower 56 cooperates with the surface of cam 60 such that when the cam rotates, the cam follower rides upon the cam surface to urge mounting plate 18 away from tape T. The cam-driven force exerted upon the mounting plate is opposite to a bias force exerted thereon by, for example, a pair of bias springs 58 and 59 each secured at one end to mounting plate 18 and at the other end to the chassis or base plate (not shown), the bias springs being illustrated as exerting a forward-directed force upon guide member 42. Thus, and as will be apparent, springs 58 and 59 urge mounting plate 18, together with head 12 and pinch roller 14 mounted thereon, into engagement with tape T, whereas the rotation of cam 60 results in a force exerted upon cam follower 56 so as to move the mounting plate in the opposite direction, that is, toward its disengaged position.

Cam 60 is rotatably driven by motor 80 so as to rotate in the counter-clockwise direction, as viewed in FIGS. 1A–1C. As the cam rotates, the radial distance from its axis of rotation 61 to the cam surface at the point then in contact with cam follower 56 is seen to increase gradually. Thus, as the cam rotates, mounting plate 18 is driven toward its disengaged position. That is, the mounting plate is seen to slide away from tape T. FIG. 2 illustrates the transmission mechanism by which motor 80 drives cam 60. As shown, motor shaft 82 of the motor is secured to a pinion 84 which drives gears 86 and 88, the latter being coupled to a shaft on which a worm gear 90 is mounted. This worm gear drives pinion 92 which is coupled or otherwise secured to cam 60. Thus, as motor 80 rotates, pinion 84, gears 86 and 88 and pinion 92 likewise rotate so as to rotate cam 60 about its axis 61. Preferably, motor 80 is energized to rotate in only a single direction, whereby cam 60 rotates in the counterclockwise direction (as viewed in FIGS. 1A–1C).

It is appreciated that the surface of cam 60 includes a portion that is of reduced radial distance from axis 61. When cam follower 56 is in contact with this portion of the cam surface, the bias force exerted on guide member 42 by springs 58 and 59 urges mounting plate 18 toward tape T so as to place the mounting plate, head 12 and pinch roller 14 in the engaged position. That is, when cam 60 rotates to the angular position such that cam follower 56 is in contact with the reduced-radius portion of the cam surface, springs 58 and 59 drive mounting plate 18 toward tape T.

It will be understood that the relative position of mounting plate 18 and, thus, the relative position of head 12 and pinch roller 14, with respect to tape T is a function of the angular rotation of cam 60. Hence, the position of the mounting plate may be sensed by sensing the angular position of the cam. In the illustrated embodiment, the angular position of cam 60 is sensed electrically by means of a set of spring contacts 62, 64 and 66 which are adapted to wipe or contact a set of conductive segments 68, 70, 72 and 74. The set of spring contacts and the set of conductive segments are rotatable with respect to each other, one of these sets being mounted on or otherwise coupled to cam 60 and the other set being fixed with respect thereto. Preferably, spring contacts 62, 64 and 66 are rotatable with the cam; and conductive segments 68, 70, 72 and 74 are fixed, as by being provided on a fixed substrate of the recorder, such as a support plate, chassis, or the like.

Advantageously, spring contacts 62, 64 and 66 are electrically interconnected; and as illustrated, each contact is disposed at a respective radial distance from axis 61, and each also is adapted to project into mechanical contact with a respective one or more of the conductive segments. Likewise, the conductive segments are disposed at respective radial distances from a point in alignment with axis 61. As an example, spring contact 62 is adapted to contact, or wipe across, segment 68; spring contact 64 is adapted to contact, or wipe across, segments 70 and 74 which are disposed at the same radial distance from axis 61; and spring contact 66 is adapted to contact, or wipe across, segment 72. In the illustrated embodiment, segment 68 is illustrated as being substantially circular, and the remaining segments are illustrated as being arcuate in shape, with segments 70 and 74 being radially spaced outward of segment 68 and with segment 72 being radially spaced outward of segments 70 and 74. Thus, spring contact 62 is in contact with segment 68 substantially throughout the entire rotation of cam 60. It will be appreciated that segment 68 need not be completely circular. Rather, this segment may be arcuate in shape, over an angular distance from, for example, the leading edge of segment 70 to the trailing edge of segment 74.

An electrical voltage, such as ground potential or other desired voltage level, is supplied to segment 68. This ground potential thus is coupled to spring contact 62 which is in contact with segment 68, and also to the remaining spring contacts 64 and 66 which are electrically interconnected with spring contact 62. As cam 60 rotates, spring contacts 62, 64 and 66 rotate therewith to apply the ground potential supplied thereto from segment 68 to respective ones of segments 70, 72 and 74, depending upon the angular position of the cam. When the cam rotates to the position illustrated in FIG. 1A, whereby mounting plate 18, head 12 and pinch roller 14 exhibit the engaged position, spring contact 64 is in contact with segment 74 such that ground potential is supplied to this segment. At this time, however, neither segment 70 nor segment 72 is in contact with a respective spring contact and, thus, ground potential is not supplied to either of these segments. Therefore, if the voltages at respective segments 70, 72 and 74 are sensed, the engaged position of mounting plate 18 is indicated when ground potential appears at segment 74.

As cam 60 continues to rotate, mounting plate 18 is driven away from tape T. When the cam reaches the angular position illustrated in FIG. 1B, the mounting plate is in its partially engaged position. At this time, spring contact 64 is in contact with segment 70 to supply ground potential thereto, while segments 72 and 74 are not supplied with this potential. Hence, the partially engaged position of mounting plate 18 and, thus, head 12 and pinch roller 14, is indicated when ground potential is provided at segment 70.

Further rotation of cam 60 continues to drive mounting plate 18 away from tape T. When the cam rotates to the position illustrated in FIG. 1C, the mounting plate, head and pinch roller exhibit the disengaged position. In this position, spring contact 66 is in contact with segment 72 to supply ground potential thereto; whereas this potential is not supplied to either segment 70 or segment 74. Hence, the disengaged position of the head, pinch roller and mounting plate is indicated when ground potential is provided at segment 72.

Thus, by detecting the voltage potentials provided at respective segments 70, 72 and 74, the angular position of cam 60 and, thus, the position of mounting plate 18, head 12 and pinch roller 14 with respect to tape T may be sensed. It will be appreciated that various alternative embodiments of an analogous position sensor may be used. For example, so-called pull-up resistors may be coupled to each of segments 70, 72 and 74 such that, when a spring contact is not in contact with a particular segment, the voltage provided thereat may be represented as a binary "1", and ground potential applied to a segment by a spring contact that rotates into contact therewith may be represented as a binary "0". Segments 70 and 74 may be electrically interconnected, and segment 72 may be of a larger arcuate length so as to be contacted by spring contact 66 when spring contact 64 contacts segment 74, for example. With this modification, voltages provided at the radially spaced apart segments 74 and 72 may be represented as, for example, [00] when cam 60 is in the angular position illustrated in FIG. 1A, [01] when the cam is in the angular position illustrated in FIG. 1B, and [10] when the cam is in the angular position illustrated in FIG. 1C. Such binary signals thus indicate the engaged, partially engaged and disengaged positions, respectively, of mounting plate 18, head 12 and pinch roller 14.

As a further modification, other angular position sensing devices may be used, such as opti-electronic sensors, magnetic sensors, and the like. However, the embodiment illustrated in FIGS. 1A-1C, together with the modified embodiment described above, is preferred because of its relative simplicity and reliability.

In operation, when a particular function control switch (e. g. one of the RECORD, PLAY, FAST FORWARD, REWIND or STOP switches) is operated, the illustrated position sensor senses whether cam 60 is in the angular position corresponding to the selected function. That is, the position sensor determines whether the cam and, thus, mounting plate 18, is in the proper position by which the selected function may be carried out. If not, motor 80 is energized to rotate the cam until the cam reaches the proper angular position. At that time, the position sensor senses this proper position and operates to deenergize the motor. For example, let it be assumed that the RECORD or PLAY switch is operated. If cam 60 is not in the angular position illustrated in FIG. 1A, motor 80 is energized to rotate the cam. Then, when ground potential is provided at segment 74, thus indicating that mounting plate 18, head 12 and pinch roller 14 are in the engaged position, the motor is deenergized. The mounting plate thus remains fixed at this engaged position. As another example, if the FAST FORWARD or REWIND switch is operated, the position sensor senses whether cam 60 exhibits the angular position shown in FIG. 1B. If not, motor 80 is energized to rotate the cam until this position is sensed. At that time, the motor is deenergized to maintain the mounting plate in this partially engaged position. Finally, and as a last example, when the STOP switch is operated, the position sensor senses whether cam 60 exhibits the angular position shown in FIG. 1C. If not, motor 80 is energized until this angular position is sensed. At that time, the motor is deenergized and mounting plate 18, head 12 and pinch roller 14 are maintained at the disengaged position.

One embodiment of motor control circuitry by which the aforementioned operation may be carried out is illustrated in FIG. 3. It should be appreciated that the circuitry of FIG. 3 merely is a schematic logic diagram of one form of control circuit. Various modifications of this circuit are contemplated; and a microprocessor-implemented control circuit will be described below with respect to FIG. 4.

The control circuit of FIG. 3 includes a NAND gate 114, OR gates 116, 118, 120, 122 and 124, another NAND gate 132, a flip-flop circuit 134 and a drive transistor 136. Also illustrated are the aforementioned function control switches, these switches including RECORD switch 94, PLAY switch 96, FAST FORWARD switch 98, REWIND switch 100 and STOP switch 102. These switches are illustrated as push-button switches, each having one contact connected in common to ground potential. When a respective one of the switches is operated, or closed, the other contact thereof is supplied with ground potential. If desired, these switches may be electrically interconnected in a conventional manner in accordance with a desired hierarchy such that, when one switch of greater hierarchy is closed, the closure of any of the remaining switches is ineffective. The second terminal of each function control switch 94, 96, 98, 100 and 102 is coupled to a source of operating potential +V via a pull-up resistor 104, 106, 108, 110 and 112, respectively. Hence, a relatively higher voltage level, represented as a binary "1", is provided at the second terminal of each switch until that switch is closed. Upon closure thereof, the voltage potential provided at such second terminal is reduced to a relatively lower level represented as a binary "0".

NAND gate 114 is provided with plural inputs, each coupled to the second terminal of a respective one of control switches 94, 96, 98, 100 and 102. Hence, so long as all of these control switches are opened, a binary "1" is supplied to each input of NAND gate 114, thus producing a binary "0" at the output thereof. However, when one control switch is closed, a binary "0" is supplied to the NAND gate by that closed switch, resulting in a binary "1" at the output of NAND gate 114. The output of this NAND gate is coupled to the reset input R of flip-flop circuit 134. Thus, whenever a function control switch is closed, or operated, NAND gate 114 resets flip-flop circuit 134. The output of the flip-flop circuit is coupled to the base electrode of drive transistor 136 which, in the illustrated embodiment, is shown as an npn transistor. The collector-emitter circuit of drive transistor 136 is connected in series with motor 80. It is appreciated that, when flip-flop circuit 134 is reset, transistor 136 is energized to enable an energizing current to flow through the motor, thereby rotating cam 60.

In addition to being coupled to a respective input of NAND gate 114, the second terminal of each of control switches 94, 96, 98, 100 and 102 is coupled to an input of a respective OR gate 116, 118, 120, 122 and 124, respectively. OR gates 116 and 118 include second inputs which are coupled in common to, for example, segment 74 of the position sensor shown in FIGS. 1A–1C. These second inputs of OR gates 116 and 118 also are coupled to voltage source +V via a pull-up resistor 126. OR gates 120 and 122 include second inputs which are connected in common to segment 70. These second inputs also are coupled to the voltage source via a pull-up resistor 128. Finally, OR gate 124 includes a second input coupled to segment 72 and, in addition, to the voltage source via a pull-up resistor 130.

The outputs of OR gates 116, 118, 120, 122 and 124 are coupled to respective inputs of NAND gate 132, the output of this NAND gate being coupled to the set input S of flip-flop circuit 134. It is seen that, when all of the control switches are opened, a binary "1" is supplied thereby to each of the OR gates. Hence, NAND gate 132 is supplied with a binary "1" at each input thereof to supply a binary "0" to the set input S of flip-flop circuit 134. However, when a particular control switch is operated, or closed, a binary "0" is supplied therefrom to the OR gate connected thereto. At that time, if cam 60 is not at the angular position corresponding to the selected control switch, a binary "1" is supplied to the other input of this OR gate. Hence, even though the control switch is operated, the OR gate coupled thereto nevertheless continues to supply a binary "1" to NAND gate 132. However, when the cam rotates to the corresponding angular position, ground potential, represented as a binary "0", now is supplied to the other input of the OR gate in question. At this time, the OR gate receives a binary "0" at each input thereof so as to supply a binary "0" to NAND gate 132. The NAND gate thus applies a binary "1" to set flip-flop circuit 134. It is recalled that, when a control switch is operated, flip-flop circuit 134 is reset so as to energize drive transistor 136 and motor 80. Therefore, when the flip-flop circuit is set, as when the cam rotates to the proper angular position so as to dispose mounting plate 18, head 12 and pinch roller 14 in the proper position, the flip-flop circuit is set so as to deenergize transistor 136 and, thus, disable motor 80.

As an example, let it be assumed that cam 60, mounting plate 18, head 12 and pinch roller 14 exhibit the disengaged position illustrated in FIG. 1C. At this time, ground potential is applied to segment 72, thereby supplying a binary "0" to one input of OR gate 124. Let it now be assumed that RECORD switch 94 is operated, or closed. The binary "0" provided at the output of this RECORD switch is supplied to NAND gate 114 which, in turn, resets flip-flop circuit 134. Consequently, drive transistor 136 is energized to enable energizing current to flow through motor 80. The motor thus rotates cam 60 in the clockwise direction (viewed in FIG. 2). When the cam rotates beyond the tail portion thereof, the bias force exerted by springs 58 and 59 urges mounting plate 18 toward tape T. Hence, head 12 and pinch roller 14 are driven to the engaged position. In the engaged position, as shown in FIG. 1A, spring contact 64 contacts segment 74. Hence, ground potential now is supplied to OR gates 116 and 118. Since RECORD switch 94 is closed, OR gate 116 is supplied with a binary "0" at each input thereof. This OR gate thus applies a binary "0" to NAND gate 132, whereupon flip-flop circuit 134 is set to deenergize transistor 136 and thus disable motor 80. Accordingly, cam 60 ceases its rotation; and mounting plate 18, head 12 and pinch roller 14 remain in the engaged position shown in FIG. 1A.

If another control switch is operated, an operation similar to that described above occurs, thereby enabling motor 80 to rotate until cam 60 is driven to the angular position whereby the function selected by the operated control switch may be carried out. At that time, the OR gate which is coupled to this control switch is supplied with a binary "0" at each input thereof, resulting in the setting of flip-flop circuit 134 to disable motor 80. Of course, if cam 60 already is in the angular position by which the selected function may be carried out, the closure of the control switch does not change the state of flip-flop circuit 134 and, thus, the flip-flop circuit remains in its set state and motor 80 is not energized.

It is assumed that motor 80 operates at a relatively fast speed such that a particular control switch remains operated at least until cam 60 arrives at the angular position corresponding to the selected function. As an alternative, each control switch may be coupled to a respective flip-flop circuit which is set when the control switch is operated. Hence, the control switch may be operated only momentarily and need not remain closed until the cam rotates to the proper angular position. All of the flip-flop circuits which are coupled to the respective control switches may be reset when NAND gate 132 sets flip-flop circuit 134.

Figure 4:
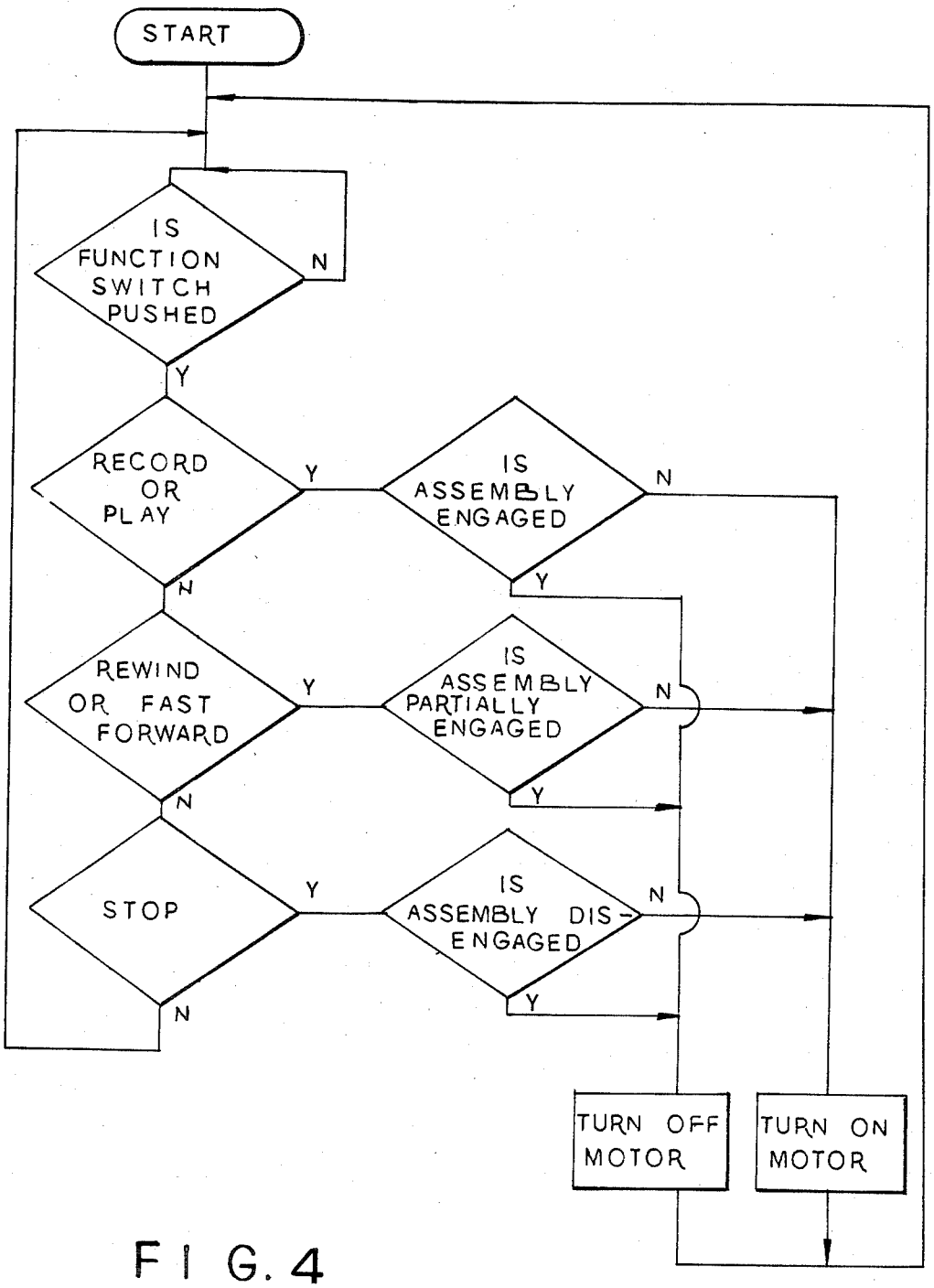
FIG. 4 is a flow chart representing a microprocessor program for implementing the motor control circuitry that may be used with this invention.

As mentioned above, the motor control circuitry which is used to selectively enable and disable motor 80 may be implemented by a microprocessor. FIG. 4 represents a flow chart of the relevant portion of a microprocessor program by which motor 80 is selectively controlled. This flow chart may be included in the main loop of the microprocessor or, alternatively, it may represent a particular branch of the microprocessor program which is carried out periodically (e. g. at a slower rate than the remaining set of instructions for the microprocessor) or when a particular condition occurs, such as the operation of a particular switch.

According to the flow chart illustrated in FIG. 4, once this portion of the program is entered, inquiry is made as to whether a function control switch has been operated, or pushed. If not, the program, or motor control sub-program, may remain in the illustrated loop, may return to the main program, may branch to another program or set of instructions, or the like. However, if the answer to this inquiry is in the affirmative, then inquiry is made as to whether the operated function switch is the RECORD or PLAY switch. It is appreciated that an indication of the operation of a function switch may be represented by a suitable signal, such as a binary "0", supplied to an appropriate port of an interface of or of the microprocessor itself.

If it is determined that the RECORD or PLAY switch is operated, inquiry is made as to whether the head support assembly is in its engaged position (shown in FIG. 1A). If not, motor 80 is energized and the illustrated sub-program returns to its beginning. This sub-program then will continue to cycle through the illustrated loop until it is determined that the head support assembly is in its engaged position. At that time, motor 80 is deenergized, and the sub-program returns to its beginning.

However, if it is determined that neither the RECORD nor PLAY switch has been operated, inquiry next is made as to whether the REWIND switch or FAST FORWARD switch is operated. If so, inquiry then is made as to whether the head support assembly is in its partially engaged position. If not, motor 80 is energized; and the sub-program cycles through the illustrated loop until the position sensor senses that the head support assembly reaches its partially engaged position. At that time, motor 80 is deenergized, and the sub-program continues.

However, if neither the REWIND nor FAST FORWARD switches had been operated, inquiry is made as to whether the STOP switch is operated. If not, the motor control sub-program returns to its beginning. However, if the STOP switch has been operated, inquiry next is made as to whether the head support assembly is in its disengaged position. If not, motor 80 is energized, and the motor control sub-program recycles through the illustrated loop until the head support assembly has been driven to its disengaged position. At that time, motor 80 is deenergized, and the motor control sub-program returns to its beginning.

It will be appreciated that, in a commercial embodiment, the microprocessor-implemented motor control circuit will be much less expensive than the discrete component version illustrated in FIG. 3. Also, the microprocessor which is used to carry out the sub-program shown in FIG. 4 also may be used to carry out various other control functions. It is preferable, therefore, to utilize the microprocessor-implemented control circuit.

While the present invention has been particularly shown and described with reference to preferred embodiments, it will be readily apparent to those of ordinary skill in the art that various changes and modifications in form and details may be made without departing from the spirit and scope of the invention. For example, in the position sensor shown in FIGS. 1A-1C, it is assumed that spring contacts 62, 64 and 66 rotate with cam 60, and conductive segments 68, 70, 72 and 74 remain fixed with respect thereto. It is readily appreciated that this relationship may be reversed, with the segments rotatable with cam 60 and the spring contacts fixed with respect thereto. Also, although only three discrete positions of mounting plate 18 have been shown and described, it is readily appreciated that additional discrete positions may be provided. This may be easily implemented merely by adding additional segments to the position sensor so as to be able to sense additional angular positions of cam 60. The discrete component version of the motor control circuit shown in FIG. 3 or the microprocessor-implemented thereof shown in FIG. 4 may be modified in an obvious, straightforward manner in order to accommodate such additional angular positions.

Also, it will be appreciated that tape T (FIGS. 1A-1C) preferably is housed in a cassette, such as the cassette mentioned in the above-referenced copending applications. However, the present invention need not be limited solely to such a cassette recorder. Furthermore, and as mentioned above, the information which is recorded by head 12 advantageously represents sounds, such as analog audio signals. However, such information may be digital signals which are not necessarily limited to be representative only of sound.

It is intended that the appended claims be interpreted as including the foregoing as well as various other changes and modifications.

What is claimed is:

1. Apparatus for supporting a record/playback transducer for use in a record and/or playback device, comprising slidable support means for supporting said transducer; mounting means for mounting said transducer on said slidable support means; guide means to guide said support means for bi-directional sliding movement; and drive means for driving said support means, said drive means including a selectively energizable motor for providing motive power, cam means coupled to and rotated by said motor and having a cam surface; said support means having a portion thereof which contacts said cam surface such that as said cam means rotates the cam surface thereof imparts driving movement to said support means, position sensing means for sensing respective positions of said support means including a set of contact means and a set of conductive segments rotatable with respect to each other, said conductive segments being selectively contacted by said contact means, one of said sets being coupled to and rotatable with said cam means and the other set being fixed with respect thereto; means for supplying an electrical voltage to one of said sets; and means for providing position signals as a function of the particular segments which are contacted by said contact means, thereby indicating the angular position of said cam means and the slidable position of said support means and motor control means for energizing said motor to change the position of said support means, said motor control means being responsive to said position signals representing a predetermined one of first, second and intermediate positions to de-energize said motor.

2. The apparatus of claim 1 further including means for exerting a spring bias on said support means to urge said support means in a predetermined direction, said spring bias being generally opposed by the driving movement imparted to said support means by the rotation of said cam means.

3. The apparatus of claim 2 wherein said first and second positions of said support means comprise engaged and disengaged positions, respectively, whereby said transducer is in position to record or playback information on a record medium loaded into said record and/or playback device when said support means exhibits said engaged position and said transducer is remote from said record medium when said support means exhibits said disengaged position; and wherein said intermediate position is intermediate said engaged and disengaged positions, whereby said transducer detects signals on said record medium when said support means exhibits said intermediate position.

4. The apparatus of claim 2 wherein said transmission means further includes gear means for mechanically coupling said motor to said cam means.

5. The apparatus of claim 4 wherein said motor is energizable in only a single direction; and wherein said cam surface includes a section of reduced radius such that, when said support means contacts said section, said spring bias drives said support means in said predetermined direction.

6. The apparatus of claim 1 wherein said set of conductive segments includes a first segment supplied with said electrical voltage and in contact with one of the contact means included in said set of contact means substantially throughout the effective rotation of said cam means, and additional segments each contacted by a respective one of additional contact means included in said set of contact means as said cam means rotates.

7. The apparatus of claim 6 wherein said electrical voltage is applied from said first segment to a particular additional segment by said contact means in accordance with the angular position of said cam means.

8. The apparatus of claim 7 wherein said three contact means includes three electrically interconnected contacts, each disposed a respective radial distance from the axis of rotation of said cam means; and wherein said set of conductive segments includes segments in alignment with respective ones of said contacts.

9. The apparatus of claim 8 wherein said three contacts are coupled to and rotatable with said cam means and said segments are fixed with respect thereto.

10. The apparatus of claim 1 wherein said motor control means comprises switch means selectively operable to energize said motor to move said support means to a predetermined position; power supply means for supplying energizing power to said motor; enable means for enabling said energizing power to be supplied to said motor when said position signals represent that said support means is not at said predetermined position; and disable means for disabling said energizing power from being supplied to said motor when said support means is at said predetermined position.

11. The apparatus of claim 10 wherein said switch means comprise plural switches, at least a first of which being operable to command the positioning of said support means at said first position thereof, at least a second of which being operable to command the position of said support means at said second position thereof, and at least a third of which being operable to command the positioning of said support means at said intermediate position thereof.

12. The apparatus of claim 11 wherein said enable means is operative to enable said energizing power to be supplied to said motor when: (a) said first of said switches operates and said position signals represent that said support means is not at said first position, (b) said second of said switches operates and said position signals represent that said support means is not at said second position, or (c) said third of said switches operates and said position signals represent that said support means is not at said intermediate position.

13. The apparatus of claim 12 wherein said disable means is operative to disable said energizing power from being supplied to said motor when: (a) said first of said switches operates and said position signals represent that said support means is at said first position, (b) said second of said switches operates and said position signals represent that said support means is at said second position, or (c) said third of said switches operates and said position signals represent that said support means is at said intermediate position.

14. Apparatus for supporting and positioning a record/playback transducer for use in a record and/or playback device of the type being capable of receiving a record medium and having function control switches including at least a first switch selectively operative to command said transducer into engagement with said record medium to record or playback information, at least a second switch selectively operative to command said transducer into disengagement with said record medium to permit the latter to be received by or removed from said device, and at least a third switch selectively operative to command said transducer into partial engagement with said record medium to detect signals thereon, said apparatus comprising slidable support means for supporting said transducer; mounting for mounting said transducer on said slidable support means; guide means to guide said support means for bi-directional sliding movement; a selectively energizable motor uni-directionally rotatable to provide motive power; rotatable cam means mechanically coupled to and rotatable by said motor, said cam means having a cam surface for driving said support means as said cam means rotates; means for exerting a spring bias on said support means to urge said support means in a direction opposite to the direction in which it is driven by said cam means; sensing means for sensing the angular position of said cam means and including a set of contact means and a set of conductive segments rotatable with respect to each other, said conductive segments being selectively contacted by said contact means, one of said sets being coupled to and rotatable with said cam means and the other set being fixed with respect thereto; means for supplying an electrical voltage to one of said sets; and means for providing digital position signals as a function of the particular segments which are contacted by said contact means, thereby indicating the angular position of said cam means and the relationship of said transducer with respect to said record medium; and motor control means responsive to the selected operation of said function control siwtches and to the digital position signals for energizing said motor until said support means move said transducer into the commanded relationship with said record medium.

15. The apparatus of claim 14 wherein said motor control means includes power supply means for supplying energizing power to said motor; enable means for enabling said energizing power to be supplied to said motor when said sensing means senses that said transducer is not in the commanded relationship with said record medium; and disable means for disabling said energizing power from being supplied to said motor when said transducer is in said commanded relationship.

16. The apparatus of claim 15 wherein said enable means is operative to enable said energizing power to be supplied to said motor when: (a) said first switch operates and said sensing means does not sense said transducer in engagement with said record medium, (b) said second switch operates and said sensing means does not sense said transducer in disengagement with said record medium, or (c) said third switch operates and said sensing means does not sense said transducer in partial engagement with said record medium.

17. The apparatus of claim 16 wherein said disable means is operative to disable said energizing power from being supplied to said motor when: (a) said first switch operates and said sensing means senses said transducer in engagement with said record medium, (b) said second switch operates and said sensing means senses said transducer in disengagement with said record medium, or (c) said third switch operates and said sensing means senses said transducer in partial engagement with said record medium.

18. The apparatus of claim 14 wherein said set of conductive segments includes a first segment supplied with said electrical voltage and in contact with one of the contact means included in said set of contact means substantially throughout the effective rotation of said cam means, and additional segments each contacted by a respective one of additional contact means included in said set of contact means as said cam means rotates.

19. The apparatus of claim 18 wherein said electrical voltage is applied from said first segment to a particular additional segment by said contact means in accordance with the angular position of said cam means.

20. The apparatus of claim 19 wherein said set of contact means includes three electrically interconnected contacts, each disposed a respective radial distance from the axis of rotation of said cam means; and wherein said set of conductive segments includes segments in alignment with respective ones of said contacts.

21. The apparatus of claim 20 further including means for exerting a spring bias on said support means to urge said transducer in a predetermined direction, said spring bias being generally opposed by the driving movement imparted to said support means by the rotation of said cam means.

22. Apparatus for supporting a record/playback transducer for use in a record and/or playback device, comprising slidable support means for supporting said transducer; mounting means for mounting said transducer on said slidable support means; guide means to guide said support means for bi-directional sliding movement; and means for driving said support means, said means for driving said support means including a selectively energizable motor for providing motive power, rotatable drive means coupled to and rotated by said motor for moving said support means such that as said rotatable drive means rotates it imparts driving movement to said support means, position sensing means for sensing respective positions of said support means including digital signal generating means cooperable with said rotatable drive means to generate discrete plural-bit digital signals as said rotatable drive means rotates to discrete angular positions, thereby indicative respective angular positions of said rotatable drive means and the slidable position of said support means; and motor control means for energizing said motor to change the position of said support means, said motor control means including microprocessor means responsive to said plural-bit digital signals representing a predetermined one of first, second and intermediate positions to de-energize said motor.

* * * * *

UNITED STATES PATENT AND TRADEMARK OFFICE
CERTIFICATE OF CORRECTION

PATENT NO. : 4,547,821
DATED : October 15, 1985
INVENTOR(S) : Richard G. Rutkowski et al.

It is certified that error appears in the above-identified patent and that said Letters Patent are hereby corrected as shown below:

Claim 8, Column 15, Line 24, delete "three" and insert --set of--.

Claim 11, Column 15, Line 49, change "position" to --positioning--.

Claim 14, Column 16, Line 20, after "mounting" insert --means--.

Claim 22, Column 18, Line 22, change "indicative" to --indicating--.

Signed and Sealed this

Thirty-first Day of December 1985

[SEAL]

Attest:

DONALD J. QUIGG

Attesting Officer

Commissioner of Patents and Trademarks